United States Patent
Aurongzeb et al.

(10) Patent No.: US 10,013,022 B1
(45) Date of Patent: Jul. 3, 2018

(54) 360 STATIC/HINGE STRUCTURE WITH DEFORMABLE PARTS

(71) Applicant: Dell Products L.P., Round Rock, TX (US)

(72) Inventors: Deeder M. Aurongzeb, Austin, TX (US); Michiel Knoppert, Amsterdam (NL); Mark R. Ligameri, Santa Rosa, FL (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/430,926

(22) Filed: Feb. 13, 2017

(51) Int. Cl.
*G06F 1/16* (2006.01)
*F16C 11/12* (2006.01)
*E05D 1/00* (2006.01)

(52) U.S. Cl.
CPC ............ *G06F 1/1616* (2013.01); *E05D 1/00* (2013.01); *F16C 11/12* (2013.01); *G06F 1/1652* (2013.01); *G06F 1/1679* (2013.01); *G06F 1/1681* (2013.01); *E05Y 2900/606* (2013.01)

(58) Field of Classification Search
CPC .... G06F 1/1616; G06F 1/1679; G06F 1/1681; G06F 1/1652; E05D 1/00; F16C 11/12; E05Y 2900/606
See application file for complete search history.

(56) References Cited

U.S. PATENT DOCUMENTS

| | | | | |
|---|---|---|---|---|
| 6,483,697 | B1 * | 11/2002 | Jenks | G06F 1/1626 190/903 |
| 9,785,200 | B1 * | 10/2017 | Knoppert | G06F 1/1681 |
| 2010/0136320 | A1 * | 6/2010 | Matviya | C04B 35/52 428/316.6 |
| 2012/0307423 | A1 * | 12/2012 | Bohn | G06F 1/1641 361/679.01 |

(Continued)

OTHER PUBLICATIONS

Javdanitehran, M., et al. "Effect of embedded printed circuit board (PCB) sensors on the mechanical behavior of glass fiber-reinforced polymer (GFRP) structures." *Smart Materials and Structures* 25.6 (2016): 065016; 11 pages.

(Continued)

*Primary Examiner* — Dimary Lopez Cruz
*Assistant Examiner* — Abhishek Rathod
(74) *Attorney, Agent, or Firm* — Baker Botts L.L.P.

(57) ABSTRACT

Systems and methods are disclosed for rotationally coupling housing portions of an information handling system. An information handling system may include a housing having a first housing portion and a second housing portion. The information handling system may also include a hinge assembly coupling the first housing portion and the second housing portion, the hinge assembly including a first hinge, a second hinge, and a deformable foam, the first hinge, the second hinge, and the deformable foam may allow the hinge assembly to bend when the first housing portion is rotated in relation to the second housing portion. In addition, the information handling system may include a flexible display (Continued)

coupled to the first housing portion and the second housing portion, the flexible display to be placed over the first housing portion, the second housing portion, and the hinge assembly and configured to bend when the hinge assembly bends.

20 Claims, 8 Drawing Sheets

(56) References Cited

U.S. PATENT DOCUMENTS

| | | | | |
|---|---|---|---|---|
| 2012/0325689 A1* | 12/2012 | Wibby | ................ | A47B 23/043 |
| | | | | 206/45.2 |
| 2014/0007376 A1* | 1/2014 | Brewer | ................ | E05D 1/02 |
| | | | | 16/225 |
| 2015/0077917 A1* | 3/2015 | Song | ................ | G06F 1/1652 |
| | | | | 361/679.27 |
| 2015/0261259 A1* | 9/2015 | Endo | ................ | G06F 1/1652 |
| | | | | 361/679.06 |
| 2016/0085268 A1* | 3/2016 | Aurongzeb | ................ | G06F 1/1652 |
| | | | | 345/156 |
| 2016/0187935 A1* | 6/2016 | Tazbaz | ................ | G06F 1/1681 |
| | | | | 361/679.03 |

OTHER PUBLICATIONS

Zhu, Jiaqi, et al. "Strong and stiff aramid nanofiber/carbon nanotube nanocomposites." ACS nano 9.3 (2015): 2489-2501; 13 pages.

Sekar, Deepak, "Jack Kilby, Bob Noyce and the 3D Integrated Circuit." Monolith IC3D, Retrieved from http://www.monolithic3d.com/blog/jack-kilby-bob-noyce-and-the-3d-integrated-circuit, Mar. 21, 2011; 4 pages.

* cited by examiner

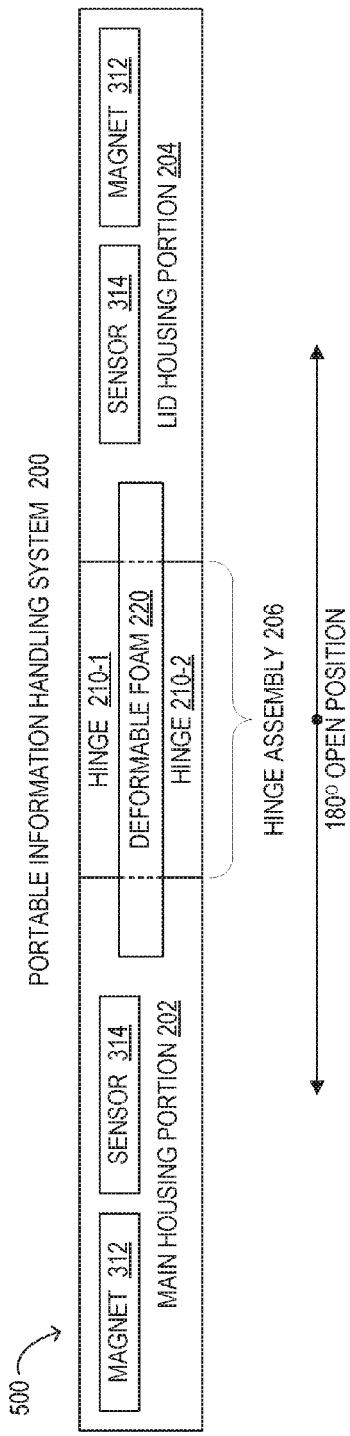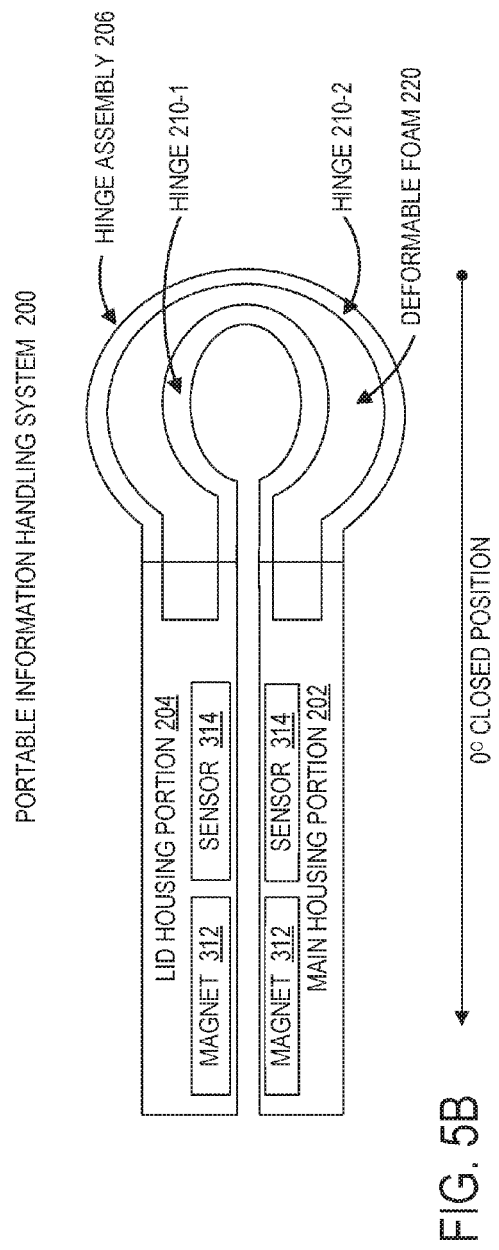
FIG. 5A
FIG. 5B

360 STATIC/HINGE STRUCTURE WITH DEFORMABLE PARTS

BACKGROUND

Field of the Disclosure

This disclosure relates generally to information handling systems and, more particularly, to a 360 degree static hinge structure with deformable parts.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable information handling systems, such as, smart phones, tablet computers, notebook computers, media players, digital cameras, 2-in-1 tablet-laptop combination computers, wireless organizers, and/or combinations thereof. A portable information handling system may generally be any device that a user may carry for handheld use and that includes a processor. Portable information handling systems may include one or more flexible displays that bend and flex as the portable information handling system is adjusted between various positions by the user. Such bending may cause stress to the flexible display. Thus, it may be desirable to control the stress caused to a display as the portable information handling system is adjusted between various positions.

SUMMARY

In one aspect, a disclosed information handling system may include a housing having a first housing portion and a second housing portion. The information handling system may also include a hinge assembly coupling the first housing portion and the second housing portion, the hinge assembly may include a first hinge, a second hinge, and a deformable foam, the first hinge, the second hinge, and the deformable foam may allow the hinge assembly to bend when the first housing portion is rotated in relation to the second housing portion. The information handling system may further include a flexible display coupled to the first housing portion and the second housing portion, the flexible display to be placed over the first housing portion, the second housing portion, and the hinge assembly and configured to bend when the hinge assembly bends.

In any of the disclosed embodiments of the information handling system, each of the first hinge and the second hinge may include one or more of a spring steel sheet and a fiber including the deformable foam coupled between the first housing portion and the second housing portion. Each of the first hinge and the second hinge may be allowed to deform to allow the hinge assembly to bend.

In any of the disclosed embodiments of the information handling system, the hinge assembly may allow the first housing portion to be rotated in relation to the second housing portion between a zero degree angle and a 360 degree angle.

In any of the disclosed embodiments of the information handling system, the deformable foam may be one or more of a thermoplastic elastomer, a thermoplastic polyurethane, a vulcanized rubber, a vulcanized rubber having carbon nanotubes, a vulcanized rubber having a creek resistance material, a laminate foam, and an Aramid fiber.

In any of the disclosed embodiments of the information handling system, the deformable foam may be one or more of an aramid fiber including a laminate foam at a center portion of the deformable foam and carbon nanotubes outside the center portion, and a polymeric fiber composite including a carbon nanotube fiber.

In any of the disclosed embodiments of the information handling system, the deformable foam may further comprise one or more devices including an antenna element, a multi-frequency antenna, a balanced line tuner, a Wi-Fi element, a sensor, and a touch sensor, where the one or more devices may be comprised of one or more of Ag nanowire, graphene, and graphene nanowire.

In any of the disclosed embodiments of the information handling system, the information handling system may further include a set of magnets including a first magnet and a second magnet, the first housing portion may include the first magnet and the second housing portion may include the second magnet, the first housing portion and the second housing portion may be in a fixed position when the first magnet is in proximity of the second magnet such that they magnetically couple with each other.

In any of the disclosed embodiments of the information handling system, the set of magnets may be one or more of a polymer magnet and a magnet in polymer.

In any of the disclosed embodiments of the information handling system, the deformable foam may have an anisotropic shape to guide directional deformation of the deformable foam.

In any of the disclosed embodiments of the information handling system, the anisotropic shape of the deformable foam may be one of an anisotropic hexagonal shape, an anisotropic honey comb shape, an anisotropic triangular shape, an anisotropic diamond shape, an anisotropic polygonal shape, and an anisotropic polygonal bar shape.

In another aspect, a disclosed method of rotationally coupling housing portions of an information handling system may include rotationally coupling a first housing portion and a second housing portion of the information handling system with a hinge assembly, the hinge assembly may include a first hinge, a second hinge, and a deformable foam, the first hinge, the second hinge, and the deformable foam may allow the hinge assembly to bend when the first housing portion is rotated in relation to the second housing portion. The method may also include coupling a flexible display to the first housing portion and the second housing portion, the flexible display to be placed over the first housing portion, the second housing portion, and the hinge assembly and configured to bend when the hinge assembly bends.

In any of the disclosed embodiments of the method, each of the first hinge and the second hinge may include one or more of a spring steel sheet and a fiber including the deformable foam coupled between the first housing portion and the second housing portion. Each of the first hinge and the second hinge may be allowed to deform to allow the hinge assembly to bend.

In any of the disclosed embodiments of the method, the hinge assembly may allow the first housing portion to be rotated in relation to the second housing portion between a zero degree angle and a 360 degree angle.

In any of the disclosed embodiments of the method, the deformable foam may be one or more of a thermoplastic elastomer, a thermoplastic polyurethane, a vulcanized rubber, a vulcanized rubber having carbon nanotubes, a vulcanized rubber having a creek resistance material, a laminate foam, and an Aramid fiber.

In any of the disclosed embodiments of the method, the deformable foam may be one or more of an aramid fiber including a laminate foam at a center portion of the deformable foam and carbon nanotubes outside the center portion, and a polymeric fiber composite including a carbon nanotube fiber.

In any of the disclosed embodiments of the method, the deformable foam may further comprise one or more devices including an antenna element, a multi-frequency antenna, a balanced line tuner, a Wi-Fi element, a sensor, and a touch sensor, where the one or more devices may be comprised of one or more of Ag nanowire, graphene, and graphene nanowire.

In any of the disclosed embodiments of the method, the information handling system may also include a set of magnets including a first magnet and a second magnet, the first housing portion including the first magnet and the second housing portion including the second magnet, the first housing portion and the second housing portion may be in a fixed position when the first magnet is in proximity of the second magnet such that they magnetically couple with each other.

In any of the disclosed embodiments of the method, the set of magnets may be one or more of a polymer magnet and a magnet in polymer.

In any of the disclosed embodiments of the method, the deformable foam may have an anisotropic shape to guide directional deformation of the deformable foam.

In any of the disclosed embodiments of the method, the anisotropic shape of the deformable foam may be one of an anisotropic hexagonal shape, an anisotropic honey comb shape, an anisotropic triangular shape, an anisotropic diamond shape, an anisotropic polygonal shape, and an anisotropic polygonal bar shape.

BRIEF DESCRIPTION OF THE DRAWINGS

For a more complete understanding of the present invention and its features and advantages, reference is now made to the following description, taken in conjunction with the accompanying drawings, in which:

FIG. 5A illustrates a side view of a portable information handling system in a 180° open position;

FIG. 5B illustrates a side view of a portable information handling system in a 0° closed position;

DESCRIPTION OF PARTICULAR EMBODIMENT(S)

Figure 1:
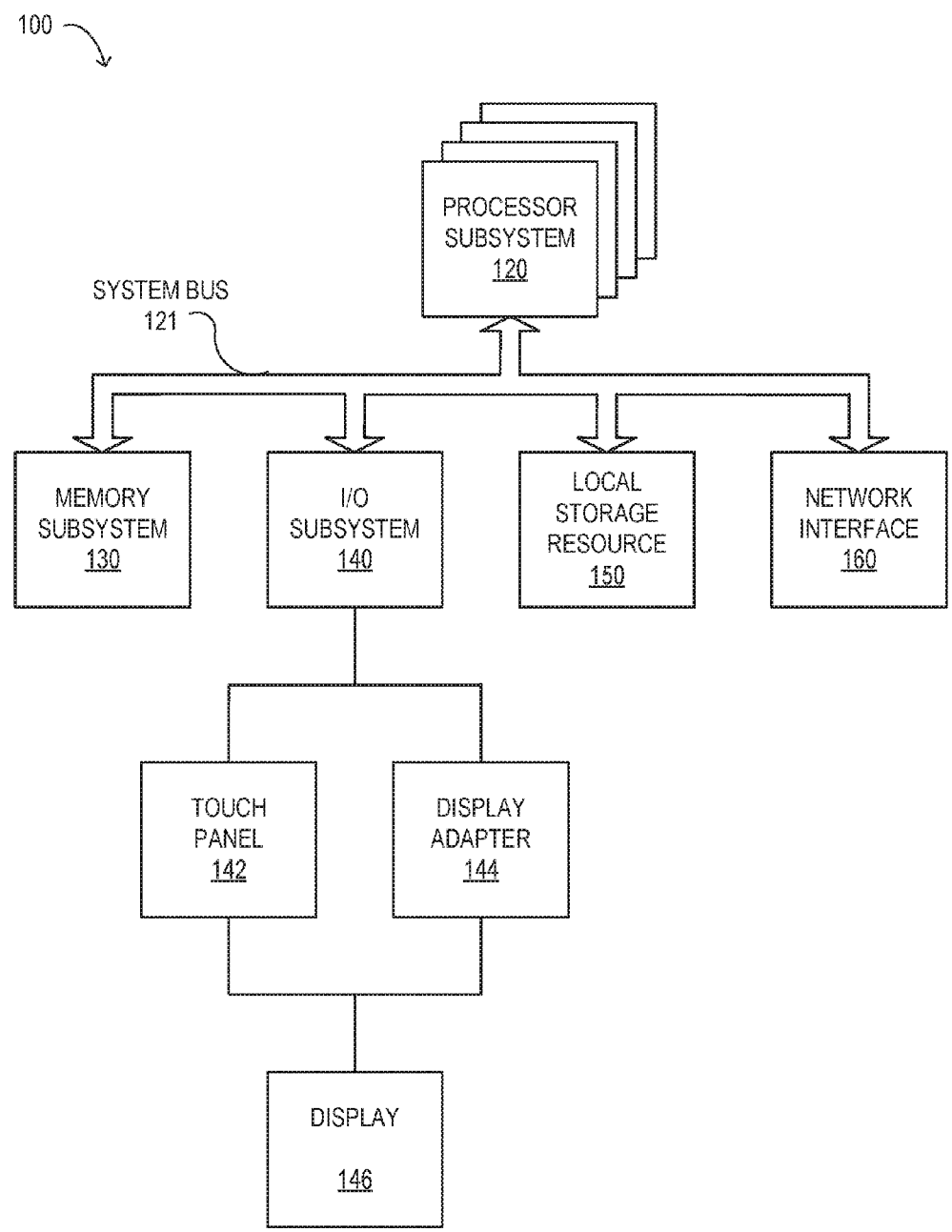
FIG. 1 is a block diagram of selected elements of an embodiment of a portable information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72."

As noted previously, portable information handling systems may include one or more flexible displays. Such displays may bend as the portable information handling system is rotated, bent, and/or adjusted to different positions. Such bending may cause stress (e.g., tensile stress) on the flexible display at or near the bend location(s), which in turn may affect the structural integrity, performance, and/or durability of the display. For example, a flexible display may extend over a portion of a hinge assembly rotationally coupling housing portions of the portable information handling system. As the housing portions rotate to different positions relative to each other, the flexible display may bend at different degrees, resulting in varying amounts of stress on the flexible display at or near the hinge location. As described in more detail below, the hinge assembly may be designed to control and reduce the stress on the flexible display as the housing portions are rotated.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

Turning now to the drawings, FIG. 1 illustrates a block diagram depicting selected elements of a portable information handling system 100 in accordance with some embodiments of the present disclosure. In various embodiments, portable information handling system 100 may represent different types of portable information handling systems, such as, smart phones, tablet computers, notebook computers, media players, digital cameras, 2-in-1 tablet-laptop combination computers, and wireless organizers. Components of portable information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network. Network interface 160 may enable information handling system 100 to communicate over the network using a suitable transmission protocol and/or standard, including, but not limited to, transmission protocols and/or standards enumerated below with respect to the discussion of the network. In some embodiments, network interface 160 may be communicatively coupled via the network to a network storage resource. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network and its various components may be implemented using hardware, software, or any combination thereof.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in a network storage resource, not shown).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In portable information handling system 100, I/O subsystem 140 may comprise a system, device, or apparatus generally operable to receive and/or transmit data to/from/within portable information handling system 100. I/O subsystem 140 may represent, for example, a variety of communication interfaces, graphics interfaces, video interfaces, user input interfaces, and/or peripheral interfaces. As shown, I/O subsystem 140 may comprise touch panel 142 and display adapter 144. Touch panel 142 may include circuitry for enabling touch functionality in conjunction with display 146 that is driven by display adapter 144.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data. In system 100, I/O subsystem 140 may comprise a system, device, or apparatus generally operable to receive and/or transmit data to/from/within system 100. In addition to local storage resources 150, in some embodiments, portable information handling system 100 may communicatively couple via network 165 to a network storage resource (not shown) using network interface 160 discussed below.

Network interface 160 may be a suitable system, apparatus, or device operable to serve as an interface between portable information handling system 100 and network 165. Network interface 160 may enable portable information handling system 100 to communicate over network 165 using any suitable transmission protocol and/or standard, including, but not limited to various transmission protocols and/or standards. Network 165 coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data or information). In some embodiments, network 165 communicatively coupled to network interface 160 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 165, network interface 160, and/or various components associated therewith may be implemented using hardware, software, or any combination thereof. Network interface 160 may enable wired and/or wireless communications to and/or from portable information handling system 100.

Figure 2:
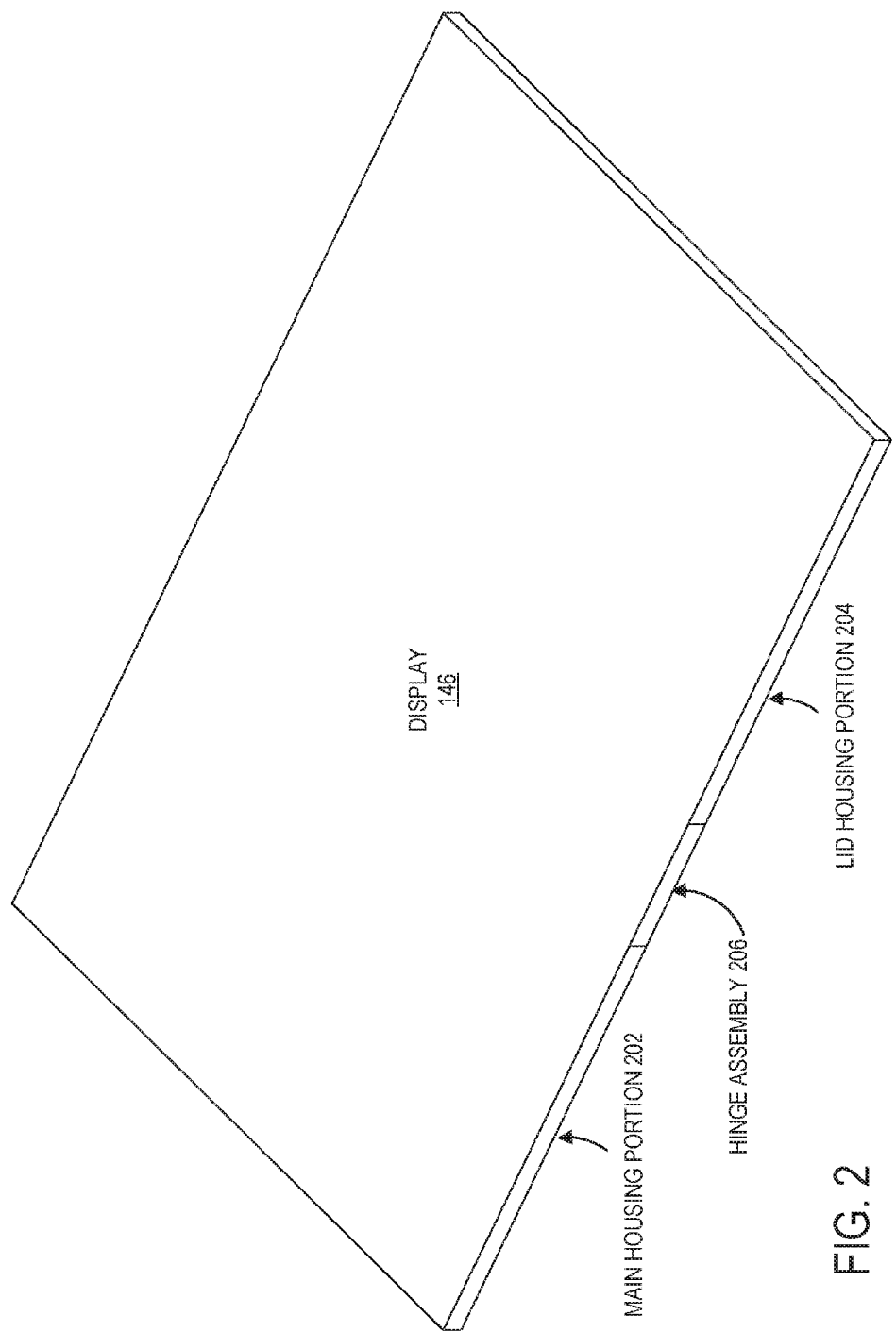
FIG. 2 illustrates a perspective view of a portable information handling system having rotationally-coupled housing portions.

Turning now to FIG. 2, is a perspective view of a portable information handling system having rotationally-coupled housing portions. In the example embodiment, a main housing portion 202 rotationally couples to a lid housing portion 204 to support various configurations to interact with an end user. More specifically, main housing portion 202 couples to lid housing portion 204 via hinge assembly 206 such that a user may rotate main housing portion 202 and/or lid housing portion 204 relative to each other. Main housing portion 202 and lid housing portion 204 may hold one or more components of the portable information handling system, including but not limited to processor subsystem 120, system bus 121, memory subsystem 130, I/O subsystem 140, local storage resource 150, network interface 160, touch panel 142, display adapter 144, and display 146 discussed above with respect to FIG. 1.

In some embodiments, portable information handling system 200 may include one or more displays for visually presenting information. For example, display 146 may be touch panel 142 with circuitry enabling touch functionality in conjunction with a display such that a user may provide input to portable information handling system 200 through the display. In some embodiments, display 146 may be flexible such that it can bend and change shapes while still visually presenting information to and/or accepting input from the user. For example, display 146 may be an organic light-emitting diode (OLED) formed on a flexible plastic, such as polyethylene terephthalate. In some embodiments, display 146 may couple to main housing portion 202 and lid housing portion 204 such that display 146 extends over at least some portion of hinge assembly 206. In some embodiments, main housing portion 202 may include a keyboard on a top portion of main housing portion 202. In some embodiments, display 146 may be placed over main housing portion 202, lid housing portion 204, and hinge assembly 206 and configured to bend when the hinge assembly bends.

As explained below in further detail, hinge assembly 206 allows main housing portion 202 and lid housing portion 204 to rotate between a plurality of positions. For example, when portable information handling system 200 is not in use, lid housing portion 204 may be closed over the top of main housing portion 202 so that display 146 is protected from unintended use or damage. Display 146 may also bend at varying degrees as portable information handling system 200 is moved between positions. In any position, user inputs may be communicated to an I/O subsystem and/or processor subsystem of the portable information handling system for processing, and then updated information may be communicated back to display 146 for displaying to the user.

Figure 3:
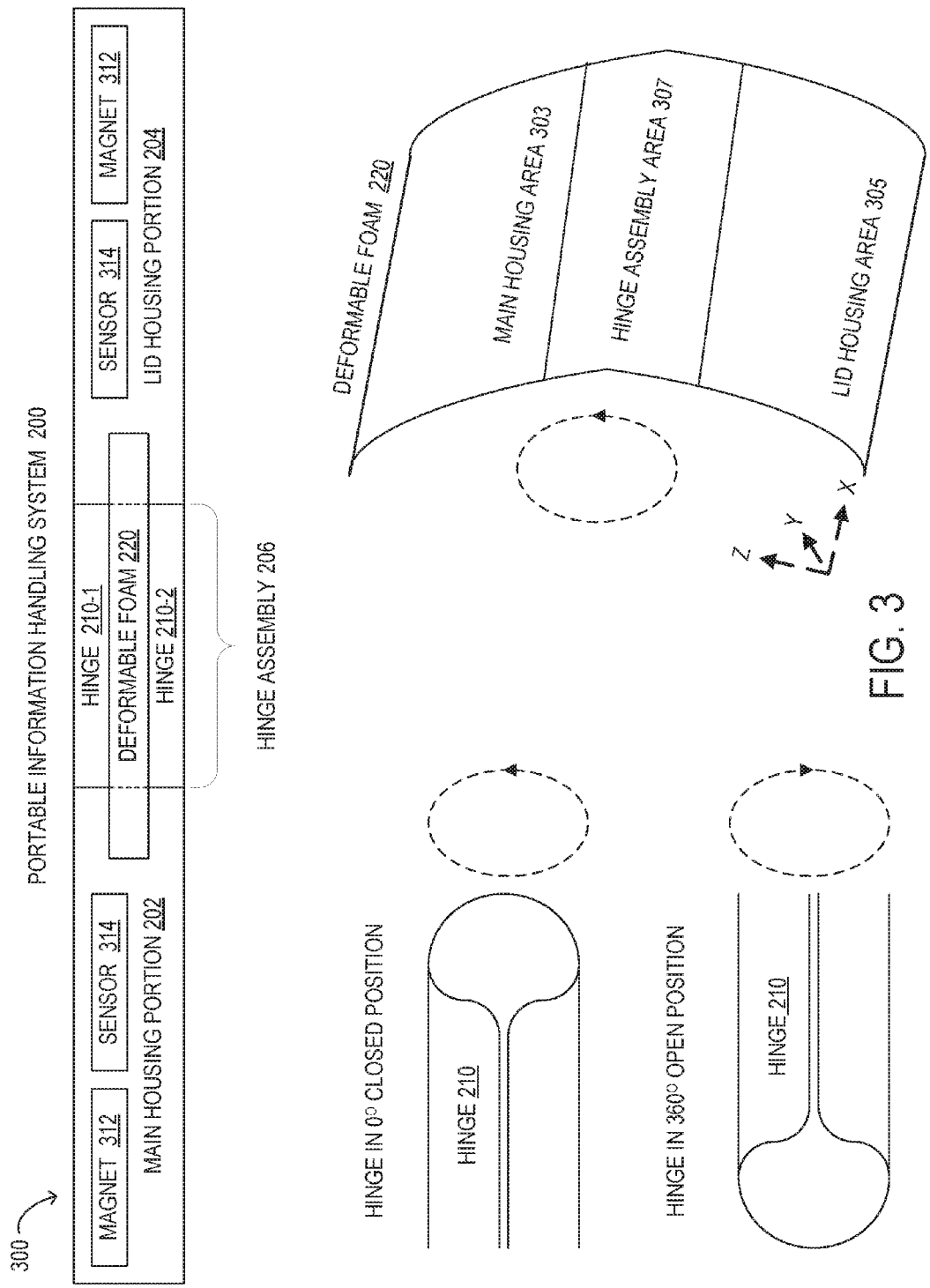
FIG. 3 illustrates a side view of a portable information handling system having a hinge assembly.

FIG. 3 illustrates a side view of a portable information handling system including a hinge assembly. As shown, main housing portion 202 and lid housing portion 204 of portable information handling system 200 may include one or more magnets 312 and one or more sensors 314. The set of magnets 312 may allow portable information handling system 200 to be in a fixed position when magnet 312 of main housing portion 202 is in proximity of magnet 312 of lid housing portion 204 such that the set of magnets 312 magnetically couple with each other. The set of magnets 312 may be one or more of a polymer magnet and a magnet in polymer. The one or more sensors 314 may provide information for use by portable information handling system 200.

As discussed above with respect to FIG. 2, the hinge assembly may rotationally couple main housing portion 202 and lid housing portion 204 of the portable information handling system such that the two housing portions may rotate to different positions relative to each other.

In some embodiments, the hinge assembly of the portable information handling system may include one or more hinges and a deformable foam. For example, hinge assembly 206 may include hinges 210-1 and 210-2, and deformable foam 220 coupled to main housing portion 202 and lid housing portion 204 of portable information handling system 200. Hinges 210 may fold and bend in both directions in relation to each other so that main housing portion 202 may rotate in relation to lid housing portion 204. As shown, hinges 210, e.g. hinges 210-1 and 210-2, may be in an approximate 0 degree hinge closed position or an approximate 360 degree hinge open position. Deformable foam 220 may include a lid housing area 305, a main housing area 303, and a hinge assembly area 307. As shown, hinge assembly area 307 of deformable foam 220 may also fold and bend between an approximate 0 degree position and a 360 degree position in both directions in relation to hinges 210-1 and 210-2 so that main housing portion 202 may rotate in relation to lid housing portion 204.

In some embodiments, hinges 210 may be comprised of spring steel sheets that may be deformable to allow hinges 210 to bend between approximately 0 and 360 degrees and return to its original shape. As shown, a hinge 210 may be in an approximate 0 degree hinge closed position or an approximate 360 degree hinge open position. The spring steel sheets of hinges 210 may be comprised of at least one of a low-alloy medium-carbon steel and a high-carbon steel with a very high yield strength to dissipate the energy of bending hinges 210 and enhance their long term reliability.

In some embodiments, hinges 210-1 and 210-2 may be comprised of a fiber including deformable foam 220 in between hinges 210-1 and 210-2. The fiber may provide bending and deformation properties of hinges 210. The fiber of hinges 210 may be comprised of one or more of an Aramid fiber, and other polymeric fiber.

In some embodiments, deformable foam 220 may be comprised of one or more of a thermoplastic elastomer (TPE), a thermoplastic polyurethane (TPU), a vulcanized rubber, a vulcanized rubber having carbon nanotubes, a vulcanized rubber having a creek resistance material, a laminate foam, an Aramid fiber, and other suitable materials. Main housing area 303 and lid housing area 305 of deformable foam 220 may be further comprised of a nano-fiber based foam laminate, an Aramid fiber loaded with carbon nanotube, a polymeric fiber composite including a carbon nanotube fiber, and other suitable materials, which may provide additional stiffening or creek resistance properties to main housing area 303 and lid housing area 305 of deformable foam 220 that may be needed based on the size of a display, while hinge assembly area 307 has a reduced stiffness. For example, a larger display, equal to or greater than an 11" diagonal, may benefit from additional stiffness, where every three inch (3") increase in the diagonal size of the display may benefit from an additional ten percent (10%) increase in stiffness.

Hinges 210-1 and 210-2 and deformable foam 220 of hinge assembly 206 may be foldable, bendable and deformable while maintaining the structural integrity of hinge assembly 206. The selection of the shape, design, and material for hinges 210 and deformable foam 220 may be based on cost, durability, weight, and/or other considerations.

Figure 4:
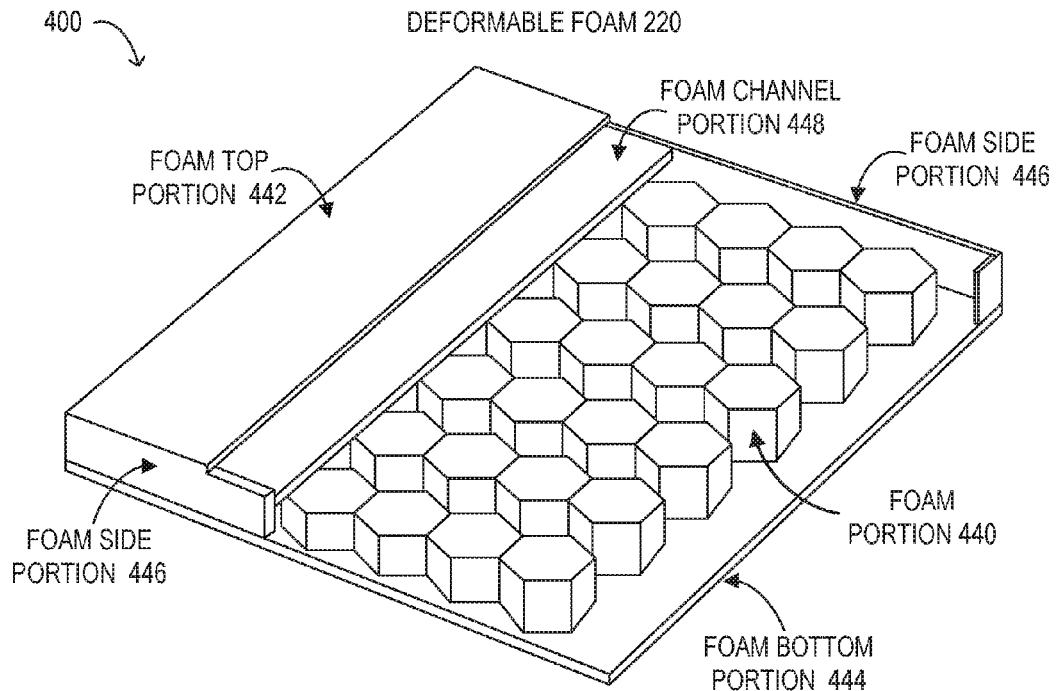
FIG. 4 are block diagrams of selected elements of embodiments of deformable foam.
Figure 4:
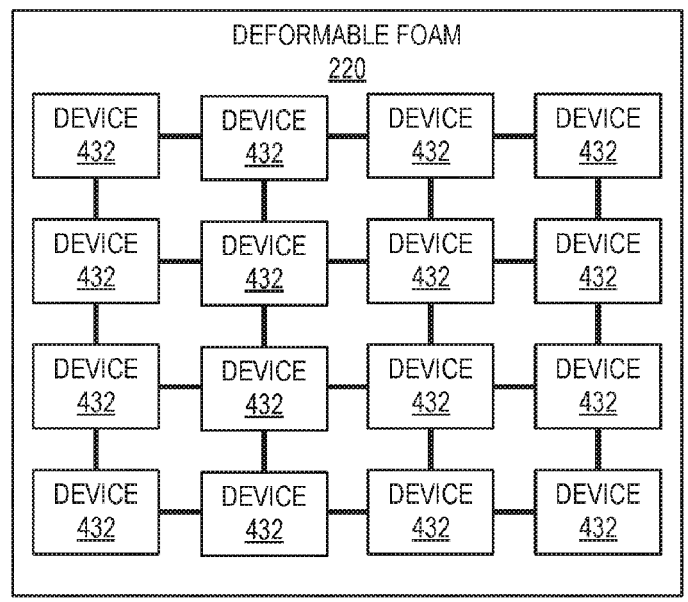

Turning now to FIG. 4, are block diagrams 400 of selected elements of embodiments of a deformable foam. Deformable foam 220 may include a foam bonding area including a foam portion 440, a foam top portion 442, a foam bottom portion 444, foam side portions 446, and a foam channel portion 448.

Form portion 440 may have an anisotropic shape to guide directional deformation of deformable foam 220 in certain directions when it is deformed in relation to hinges 210 being folded or bent. In FIG. 4, foam portion 440 is shown having an anisotropic hexagonal shape. In one or more embodiments, the anisotropic shape of foam portion 440 may be one of an anisotropic hexagonal shape, an anisotropic honey comb shape, an anisotropic triangular shape, an anisotropic diamond shape, an anisotropic polygonal shape, and an anisotropic polygonal bar shape. The directional deformation of deformable foam 220 may prevent the collapse of hinges 210 due to fatigue, which may further extend their lifetime. For example, the directional deformation of deformable foam 220 may extend hinges' 210 lifetimes beyond the approximately one to two (1-2) year collapse of hinges 210 without the directional deformation of deformable foam 220.

Foam side portions 446 may be bonded to foam top portion 442 and foam bottom portion 444 using a structural adhesive. For example, the structural adhesive may be an epoxy adhesive, an Ester of an Epoxy (EPE) resin, a ultra-violet curable epoxy, an infrared curable epoxy, a resin including a hardener, a resin including a flexible hardener, an Acrylic adhesive, a Urethane adhesive, and other types of structural adhesives. Foam channel portion 448 may be between foam portion 440 and foam top portion 442 and may be filled with a structure adhesive, e.g. one of the structural adhesives described above. Foam top portion 442 may be partially perforated to further improve the bond.

Deformable foam 220 may also include one or more devices 432. Devices 432 may be included in lid housing area 305, hinge assembly area 307, and main housing area 303 of deformable foam 220. Devices 432 may include an antenna element, a multi-frequency antenna, a balanced line tuner, a Wi-Fi element, a sensor, a touch sensor, and other types of devices. Devices 432 may be comprised of one or more of Ag nanowire, graphene, and graphene nanowire to allow devices 432 to be deformable. Deformable foam 220 including one or more devices 432 in hinge assembly area 307 may be bendable, foldable, and deformable without losing structural integrity.

Figure 5C:
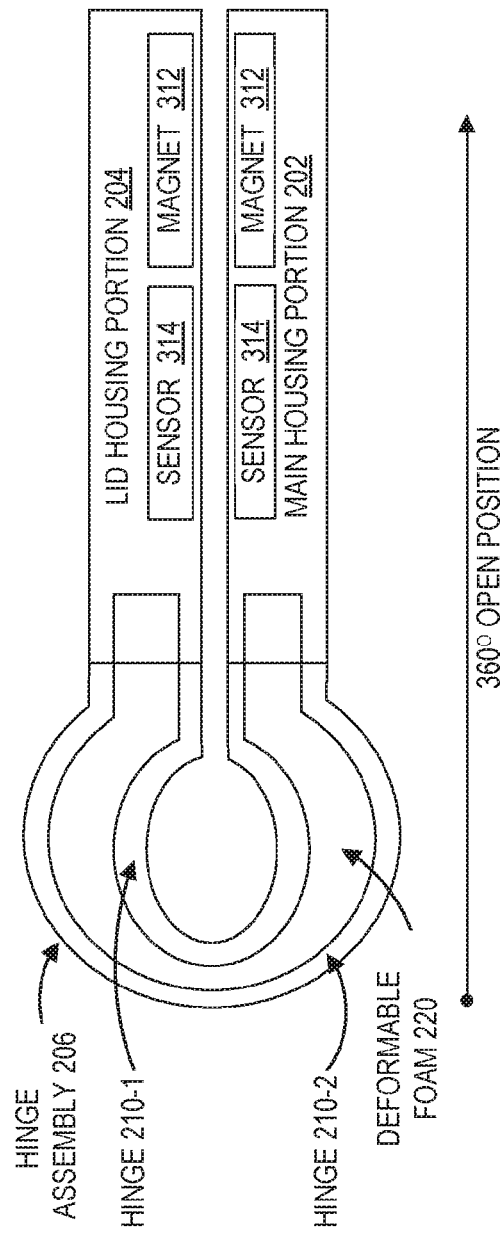
FIG. 5C illustrates a side view of a portable information handling system in a 360° open position.

FIGS. 5A, 5B, 5C, and 5D illustrates a portable information handling system in various positions. Turning now to FIG. 5A, a side view of a portable information handling system is shown. In FIG. 5A, portable information handling system 200 including hinge assembly 206 is shown in an 180° open (table or tablet) position. In tablet position, a display of portable information handling system 200 may be flat and exposed to accept touch inputs and display information. In 180° open position, portable information handling system 200 may be in a tablet position and hinge 210-1, hinge 210-2, and deformable foam 220 of hinge assembly 206 may be bent in an approximately 180° rotated position.

Turning now to FIG. 5B, a side view of a portable information handling system is shown. In FIG. 5B, portable information handling system 200 including hinge assembly 206 is shown in a 0° closed position. In the closed position, a display of portable information handling system 200 may not be exposed and unable to accept touch inputs and display information. In the 0° closed position, hinge 210-1, hinge 210-2, and deformable foam 220 of hinge assembly 206 may be bent in an approximately 0° rotated closed position. In 0° closed position, magnet 312 of main housing portion 202 is in proximity of magnet 312 of lid housing portion 204 such that magnets 312 magnetically couple with each other and allow portable information handling system 200 to be fixed in the 0° closed position.

Turning now to FIG. 5C, a side view of a portable information handling system is shown. In FIG. 5C, portable information handling system 200 including hinge assembly 206 is shown in a 360° open (tablet-only) position. In the tablet-only position, a display of portable information handling system 200 may be flat and exposed to accept touch inputs and display information. In the 360° open position, main housing portion 202 and lid housing portion 204 may be opposite of each other and a display of lid housing portion 204 may only be available for user interaction in the. Also, in the 360° open position, hinge 210-1, hinge 210-2, and deformable foam 220 of hinge assembly 206 may be bent in an approximately 360° rotated open position. Further, in the 360° open position, magnet 312 of main housing portion 202 is in proximity of magnet 312 of lid housing portion 204 such that magnets 312 magnetically couple with each other and allow portable information handling system 200 to be fixed in the 360° open (tablet-only) position. In some embodiments, tablet-only position may represent lid housing portion 204 open between approximately 181° and 359° from main housing portion 202.

Figure 5D:
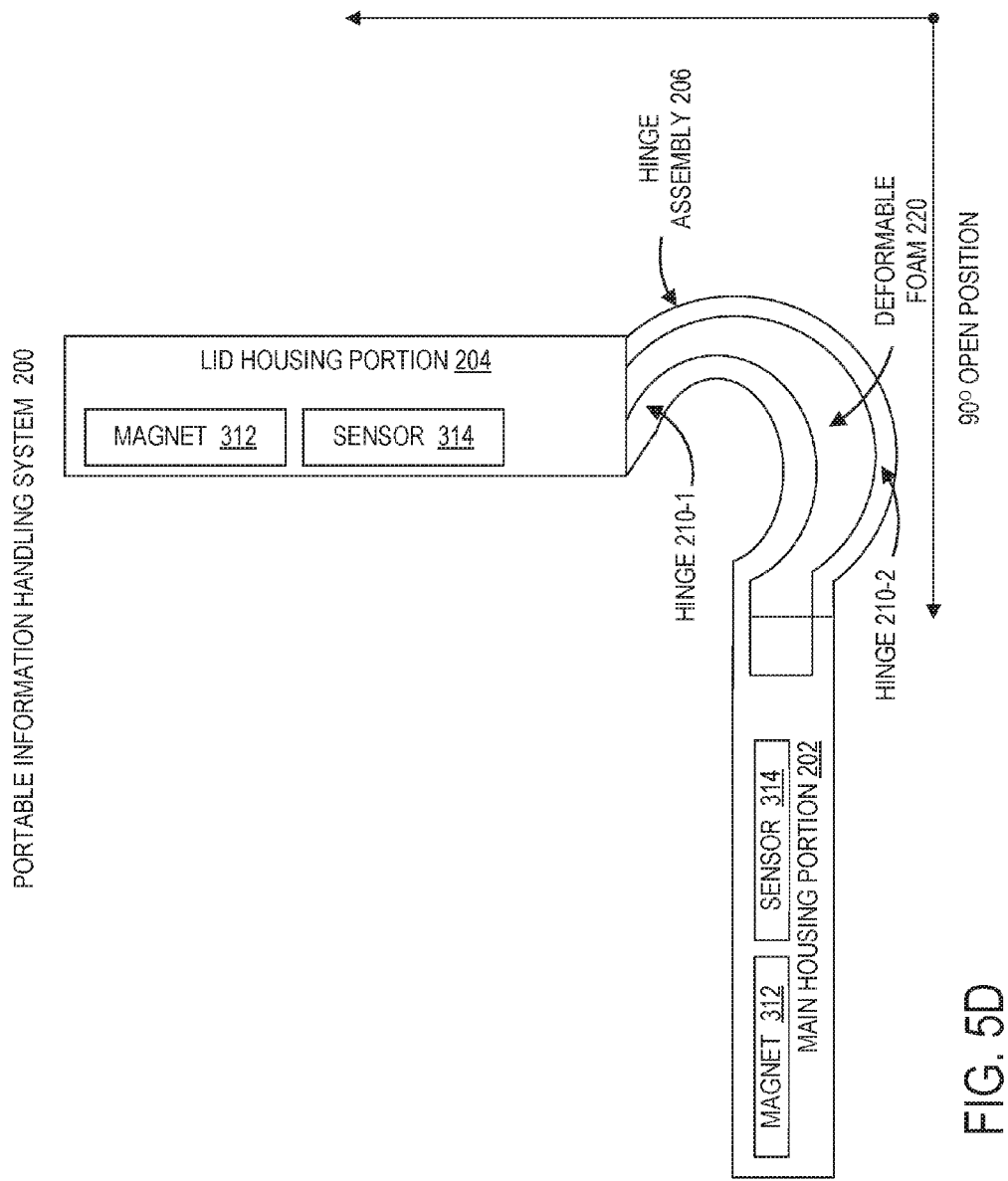
FIG. 5D illustrates a side view of a portable information handling system in a 90° open position.

FIG. 5D shows a side view of a portable information handling system. In FIG. 5D, portable information handling system 200 including hinge assembly 206 is shown in a raised 90° open (laptop) position. In the laptop position, a display of portable information handling system 200 may be raised and exposed to accept touch inputs and display information. In the 90° open position, hinge 210-1, hinge 210-2, and deformable foam 220 of hinge assembly 206 may be bent in an approximately 90° rotated open position. Hinge assembly 206 may allow portable information handling system 200 to be fixed in the 90° open (laptop) position. In some embodiments, laptop position may represent lid housing portion 204 open between approximately 1° and 179° from main housing portion 202.

Figure 6:
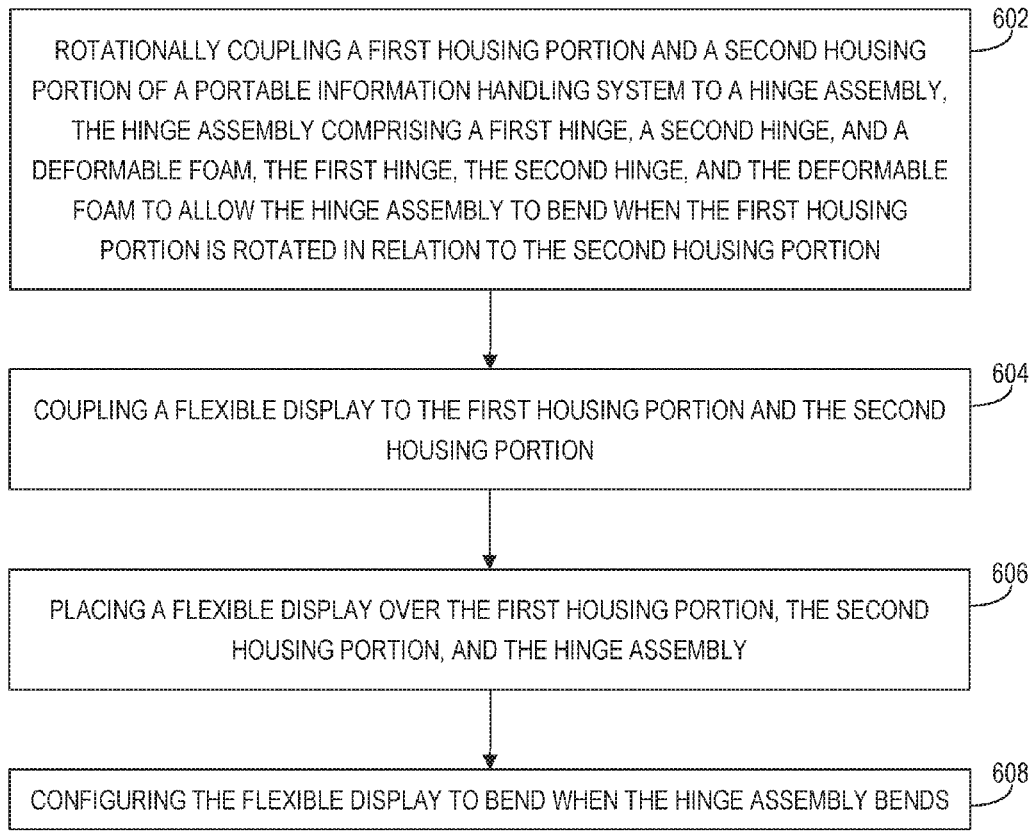
FIG. 6 is flowchart depicting selected elements of an embodiment of a method for rotationally coupling housing portions of a portable information handling system.

FIG. 6 is flowchart depicting selected elements of an embodiment of a method for rotationally coupling housing portions of a portable information handling system. It is noted that certain operations described in method 600 may be optional or may be rearranged in different embodiments.

Method 600 may begin at step 602, where a first housing portion and a second housing portion of the portable information handling system are rotationally coupled to a hinge assembly. The hinge assembly may permit the housing portions to rotate to different positions from each other, including for example, tablet, closed, tablet-only, and laptop positions discussed above with respect to FIGS. 5A, 5B, 5C, and 5D. The hinge assembly may include a first hinge, a second hinge, and deformable foam, the first hinge, the second hinge, and the deformable foam to allow the hinge assembly to bend when the first housing portion is rotated in relation to the second housing portion. In step 604, method 600 couples a flexible display to the first housing portion and the second housing portion. In step 606, method 600 places a flexible display over the first housing portion, the second housing portion, and the hinge assembly. In step 608, method 600 configures the flexible display to bend when the hinge assembly bends. After step 608, method 600 may end.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   a housing having a first housing portion and a second housing portion;
   a hinge assembly coupling the first housing portion and the second housing portion, the hinge assembly comprising a deformable foam having a first deformable foam portion proximate the first housing portion, a second deformable foam portion proximate the second housing, and a third deformable foam portion between the first deformable foam portion and the second deformable foam portion,
   the deformable foam comprising one or more of: a thermoplastic elastomer, a thermoplastic polyurethane, a vulcanized rubber, a vulcanized rubber having carbon nanotubes, a vulcanized rubber having a creek resistance material, a laminate foam, and an aramid fiber,
   the first deformable foam portion and the second deformable foam portion further comprising one or more of: a nano-fiber based foam laminate, an aramid fiber loaded with carbon nanotube, and a polymeric fiber composite including a carbon nanotube fiber,
   the first deformable foam portion and the second deformable foam portion each having a stiffness greater than the third deformable foam portion, and
   the deformable foam to allow the hinge assembly to bend when the first housing portion is rotated in relation to the second housing portion; and
   a flexible display coupled to the first housing portion and the second housing portion, the flexible display to be placed over the first housing portion, the second housing portion, and the hinge assembly and configured to bend when the hinge assembly bends.

2. The information handling system of claim 1, the hinge assembly further comprising a first hinge and a second hinge allowed to deform to allow the hinge assembly to bend.

3. The information handling system of claim 2, wherein each of the first hinge and the second hinge comprising a spring steel sheet.

4. The information handling system of claim 1, wherein the hinge assembly to allow the first housing portion to be rotated in relation to the second housing portion between a zero degree angle and a 360 degree angle.

5. The information handling system of claim 1, wherein each of the first hinge and the second hinge to allow the first housing portion to be rotated in relation to the second housing portion between a zero degree angle and a 360 degree angle.

6. The information handling system of claim 1, the deformable foam further comprising one or more devices including an antenna element, a multi-frequency antenna, a balanced line tuner, a Wi-Fi element, a sensor, and a touch sensor, wherein the one or more devices are comprised of one or more of Ag nanowire, graphene, and graphene nanowire.

7. The information handling system of claim 1, the information handling system further comprises a set of magnets including a first magnet and a second magnet, the first housing portion including the first magnet and the second housing portion including the second magnet, the first housing portion and the second housing portion to be in a fixed position when the first magnet is in proximity of the second magnet such that they magnetically couple with each other.

8. The information handling system of claim 7, wherein the set of magnets is one or more of a polymer magnet and a magnet in polymer.

9. The information handling system of claim 1, wherein the deformable foam has an anisotropic shape to guide directional deformation of the deformable foam.

10. The information handling system of claim 9, wherein the anisotropic shape of the deformable foam is one of an anisotropic hexagonal shape, an anisotropic honey comb shape, an anisotropic triangular shape, an anisotropic diamond shape, an anisotropic polygonal shape, and an anisotropic polygonal bar shape.

11. A method of rotationally coupling housing portions of an information handling system, the method comprising:
   rotationally coupling a first housing portion and a second housing portion of the information handling system with a hinge assembly, the hinge assembly comprising a deformable foam, having a first deformable foam portion proximate the first housing portion, a second deformable foam portion proximate the second housing, and a third deformable foam portion between the first deformable foam portion and the second deformable foam portion,
   the deformable foam comprising one or more of: a thermoplastic elastomer, a thermoplastic polyurethane, a vulcanized rubber, a vulcanized rubber having carbon nanotubes, a vulcanized rubber having a creek resistance material, a laminate foam, and an aramid fiber,
   the first deformable foam portion and the second deformable foam portion further comprising one or more of: a nano-fiber based foam laminate, an aramid fiber loaded with carbon nanotube, and a polymeric fiber composite including a carbon nanotube fiber, and the first deformable foam portion and the second deformable foam portion each having a stiffness greater than the third deformable foam portion;

allowing, by the deformable foam, the hinge assembly to bend when the first housing portion is rotated in relation to the second housing portion; and coupling a flexible display to the first housing portion and the second housing portion, the flexible display to be placed over the first housing portion, the second housing portion, and the hinge assembly and configured to bend when the hinge assembly bends.

12. The method of claim 11, wherein the hinge assembly further comprising a first hinge and a second hinge allowed to deform allowing the hinge assembly to bend.

13. The method of claim 12, wherein each of the first hinge and the second hinge allowing the first housing portion to be rotated in relation to the second housing portion between a zero degree angle and a 360 degree angle.

14. The method of claim 11, wherein the hinge assembly allowing the first housing portion to be rotated in relation to the second housing portion between a zero degree angle and a 360 degree angle.

15. The method of claim 11, wherein each of the first hinge and the second hinge comprising a spring steel sheet.

16. The method of claim 11, wherein the deformable foam further comprising one or more devices including an antenna element, a multi-frequency antenna, a balanced line tuner, a Wi-Fi element, a sensor, and a touch sensor, and wherein the one or more devices are comprised of one or more of Ag nanowire, graphene, and graphene nanowire.

17. The method of claim 11, wherein the information handling system further comprises a set of magnets including a first magnet and a second magnet, the first housing portion including the first magnet and the second housing portion including the second magnet, the first housing portion and the second housing portion to be in a fixed position when the first magnet is in proximity of the second magnet such that they magnetically couple with each other.

18. The method of claim 17, wherein the set of magnets is one or more of a polymer magnet and a magnet in polymer.

19. The method of claim 11, wherein the deformable foam has an anisotropic shape to guide directional deformation of the deformable foam.

20. The method of claim 19, wherein the anisotropic shape of the deformable foam is one of an anisotropic hexagonal shape, an anisotropic honey comb shape, an anisotropic triangular shape, an anisotropic diamond shape, an anisotropic polygonal shape, and an anisotropic polygonal bar shape.

* * * * *